J. R. CARMER.
HAND BRAKE MECHANISM.
APPLICATION FILED AUG. 11, 1910.
979,379.
Patented Dec. 20, 1910.
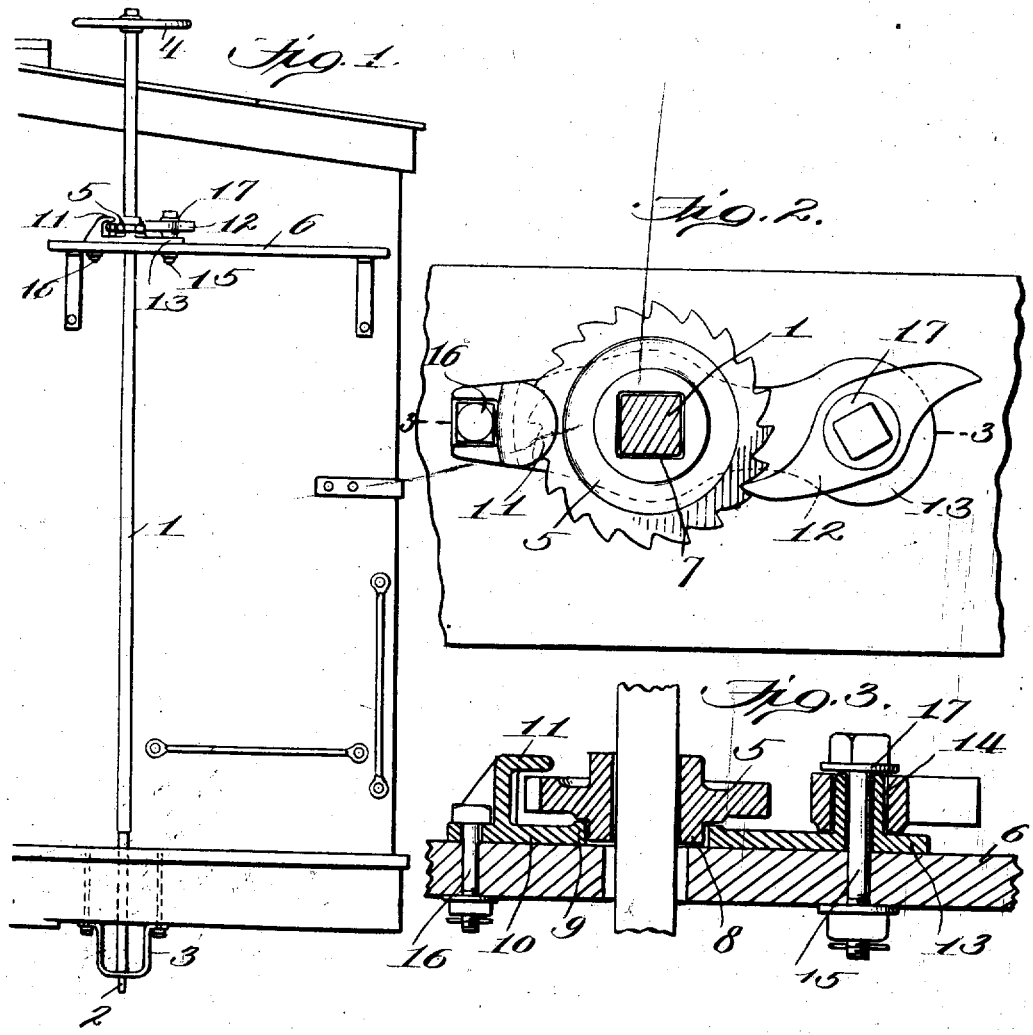

UNITED STATES PATENT OFFICE.

JAMES R. CARMER, OF WILMINGTON, DELAWARE.

HAND BRAKE MECHANISM.

979,379.   Specification of Letters Patent.   Patented Dec. 20, 1910.

Application filed August 11, 1910. Serial No. 576,680.

*To all whom it may concern:*

Be it known that I, JAMES R. CARMER, a citizen of the United States, residing at Wilmington, in the county of Newcastle and State of Delaware, have invented new and useful Improvements in Hand Brake Mechanism, of which the following is a specification.

My present invention relates to improvements in brake mechanism for railway cars, and it has for its objects primarily to provide improved means for connecting the brake shaft or staff to the ratchet or locking wheel without the necessity of using a pin or key as heretofore employed and which materially weaken the staff, and also to provide a combination bearing and spacing bracket for the brake staff, ratchet wheel and pawl, whereby the ratchet wheel will provide a bearing for the brake staff, the ratchet wheel will be retained in coöperative relation with the locking pawl and bearing bracket, and the bearing bracket preferably provides a trunnion to receive the locking pawl, whereby the pawl and ratchet wheel will be properly spaced and these parts will be maintained in proper coöperative relation.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents brake mechanism for railway cars provided with my present improvements; Fig. 2 represents a top plan view of the ratchet wheel, locking pawl, and the combined bearing and spacing bracket; Fig. 3 represents a section on the line 3—3 of Fig. 2; and Fig. 4 is a perspective view of the bearing and spacing bracket.

Similar parts are designated by the same reference characters in the several views.

My present improvements may be applied advantageously to brake mechanisms for railway cars of different types and, moreover, it may be applied to such brake mechanisms in different ways. In the present instance, I have shown the improvements as applied to brake mechanisms for ordinary freight cars, but it will be understood that the present embodiment of the invention is but one example, and that modifications and changes may be made in the construction or the relative arrangement of the parts in order that the invention may be applied to the best advantage in each case.

In the present instance, 1 designates the brake shaft or staff which, according to the present invention, is preferably made of a rod which is rectangular in cross-section, this staff in the present instance being shown as square. The lower end 2 of the staff may be rounded to form a journal and is shown supported in a bearing bracket 3, the brake chain being usually connected to the lower end of the staff. The upper end of the staff may be provided with the usual hand-wheel 4 or its equivalent whereby the staff may be rotated to set the brakes. The ratchet wheel 5 which serves to lock the staff while the brakes are set may be placed at any suitable point in the length of the staff, it being placed toward the upper end of the staff in the present instance and adjacent to a step 6. This ratchet wheel is provided with an opening 7 which is angular in form and corresponds substantially with the cross-section of the staff, this opening 7 in the present instance being square to receive and thereby form a driving connection with the square brake staff.

In order to provide a suitable bearing for the angular brake staff, I provide the ratchet wheel with an axially extended hub 8 which is cylindrical in form and serves as a journal. This journal portion 8 of the ratchet wheel is revolubly seated in an annular bearing 9 formed in a bracket 10. This bracket 10 is suitably secured to the upper side of the step 6 or to any other suitable stationary support. In order to prevent the ratchet wheel from rising and thereby disengaging the hub portion 8 thereon from its bearing in the bracket 10, I form the bracket 10 with a guard 11 which in the present instance is in the form of a lip which may be cast or formed integrally with the bracket. This guard is arranged immediately above the upper side of the ratchet wheel and thereby holds the same in coöperative relation with the bracket.

The ratchet wheel is locked while the brakes are set by means of a suitable pawl 12. In order to maintain a proper spacing between the ratchet wheel and pawl and to prevent these parts from spreading under the strain, I prefer to form the bracket 10 with an extension 13 and to form this extension with an upwardly extending trunnion or pin 14, this trunnion or pin receiving and forming a fulcrum or pivot for the pawl 12. This trunnion or pin 14 is preferably bored to permit the passage of a bolt 15 which may also extend through the step or support 6 and thereby assist the bolt 16 in retaining the combination bearing and spacing bracket in position. To retain the pawl in proper position, the bolt 15 may have a washer, head or other enlargement 17 to bear upon the top or upper side of the pawl and thereby prevent the pawl from rising and disengaging from the trunnion.

According to my present invention, the combination bearing and spacing bracket serves to rigidly and positively maintain the ratchet wheel and pawl in proper operative relation, brake staffs of angular cross-section may be used, the ratchet wheel may be mounted or applied to the brake staff at any point in its length and without the necessity of using a pin or key which would weaken the staff, and a simple and efficient bearing for the angular brake staff is provided, the construction of the parts being such that they may be quickly assembled and in case of breakage, new parts may be substituted with the greatest facility.

I claim as my invention:

1. In brake mechanism for railway cars, the combination of a brake staff of angular cross-section, a ratchet wheel coöperative therewith and having a locking pawl, and a bracket having a bearing to receive a journal portion formed separately from and surrounding said staff and having a part coöperative with the ratchet wheel to retain the same in operative relation to said pawl.

2. In brake mechanism for railway cars, the combination of a brake staff, a ratchet wheel turnable with the brake staff, a locking pawl, and a bracket having a bearing to receive a journal portion surrounding said staff, a part coöperative with the ratchet wheel to retain the same in operative relation with said pawl and having a trunnion formed thereon which constitutes a pivot or fulcrum for said pawl.

3. In brake mechanism for railway cars, the combination of a brake staff, a ratchet wheel turnable with said staff, a locking pawl for the ratchet wheel, and a combined bearing and spacing bracket, said bracket having a bearing to receive a journal portion surrounding the brake staff, a portion thereon coöperative with the ratchet wheel to retain the latter in operative relation to said pawl and having a trunnion formed integrally therewith and constituting a pivot or fulcrum for the locking pawl.

4. In brake mechanism for railway cars, the combination of a brake staff having an angular cross section, a ratchet wheel applied to said staff and turnable therewith, the ratchet wheel having a journal portion, and a bracket having a bearing to receive the journal portion on the ratchet wheel and having a guard coöperative with the ratchet wheel to retain the latter in coöperative relation with the bracket.

5. In brake mechanism for railway cars, the combination of a brake staff having an angular cross section, a ratchet wheel applied to the staff and having a correspondingly shaped angular opening, the ratchet wheel also having a hub forming a journal, and a bracket having a bearing to receive the journal portion of the ratchet wheel to form a bearing for the angular staff and also having a guard which overhangs the ratchet wheel and serves to retain the journal portion of the latter in coöperative relation with the bearing portion of the bracket.

6. In brake mechanism for railway cars, the combination of a rectangular brake staff, a ratchet wheel applied thereto and turnable therewith, a locking pawl coöperative with the ratchet wheel, the latter having a hub portion forming a journal, and a combined bearing and spacing bracket having a bearing portion to receive the journal portion of the ratchet wheel, a trunnion forming a pivot or fulcrum for the locking pawl, and a guard coöperative with the ratchet wheel to retain the journal portion in operative relation with the bearing portion of the bracket.

In testimony whereof I have hereunto set my hand in presence of two subscribing witnesses.

JAMES R. CARMER.

Witnesses:
 HARRY P. LAWRENCE,
 W. C. DROPE.